(12) United States Patent
Urriola

(10) Patent No.: US 6,648,549 B1
(45) Date of Patent: Nov. 18, 2003

(54) MODULAR DRAINAGE CHANNELS

(76) Inventor: Humberto Urriola, 48 Willawce Road, Castle Cove NSW 2068 (AU)

( * ) Notice: Subject to any disclaimer, the term of this patent is extended or adjusted under 35 U.S.C. 154(b) by 0 days.

(21) Appl. No.: 10/111,277

(22) PCT Filed: Oct. 18, 2000

(86) PCT No.: PCT/AU00/01261

§ 371 (c)(1),
(2), (4) Date: Apr. 18, 2002

(87) PCT Pub. No.: WO01/29334

PCT Pub. Date: Apr. 26, 2001

(30) Foreign Application Priority Data

Oct. 18, 1999 (AU) .............................. PQ 3490

(51) Int. Cl.[7] .................................. E02B 3/04
(52) U.S. Cl. ............................ 405/39; 405/36; 405/45; 405/53; 210/170
(58) Field of Search ............................. 405/36, 39, 40, 405/43–45, 52, 53, 80; 210/150, 151, 615–619, 170, 747

(56) References Cited

U.S. PATENT DOCUMENTS 4,483,640 A * 11/1984 Berger et al. ........... 210/710 X
5,472,297 A * 12/1995 Heselden .................... 405/286
6,368,017 B2 * 4/2002 Black ....................... 405/36 X

FOREIGN PATENT DOCUMENTS

| AU | 97123/98 A1 | 7/1999 |
|---|---|---|
| DE | 43 21 350 A1 | 1/1995 |
| EP | 0 768 432 A1 | 4/1997 |
| EP | 0768432 A1 | 4/1997 |
| EP | 0 952 257 A2 | 10/1999 |
| EP | 0 952 257 A3 | 10/1999 |
| FR | 2 410 496 | 8/1979 |
| GB | 2 338 021 A | 12/1999 |
| WO | WO 95/16833 | 6/1995 |

OTHER PUBLICATIONS

International Search Report of PCT/AU00/01261, dated Feb. 23, 2001.

International Preliminary Examination Report of PCT/AU00/01261, dated Nov. 13, 2001.

* cited by examiner

*Primary Examiner*—Heather Shackelford
*Assistant Examiner*—Sunil Singh
(74) *Attorney, Agent, or Firm*—Christie, Parker & Hale, LLP

(57) ABSTRACT

An underground infiltration drainage system comprising water storage and/or water formed by a plurality of load bearing box like modules (1, 16 and 19), arranged adjacently and wrapped in water permeable geotextile. The modules have external walls (2) with openings (6) therethrough, such that water can flow into and out of the storage and/or piping through the perforated walls (2). The perforated walls (2) have peripheral edge members (3), with thin web members (4), extending between the peripheral edge members (3), to form support for the geotextile, and to define the openings (6). This arrangement while providing structural strength, also provides a large area of perforations.

14 Claims, 5 Drawing Sheets

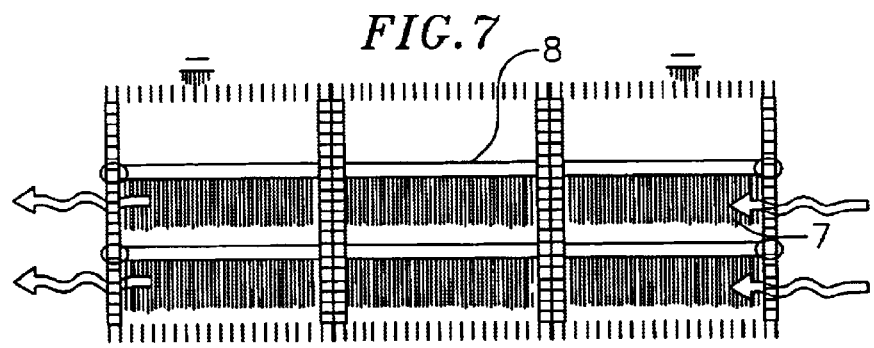
FIG. 7
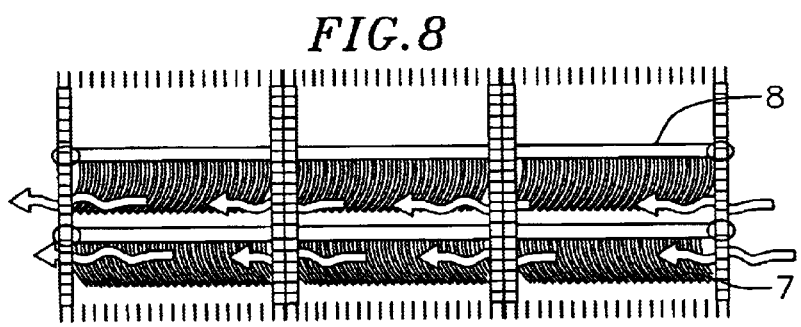
FIG. 8
FIG. 6  FIG. 3  FIG. 4  FIG. 5
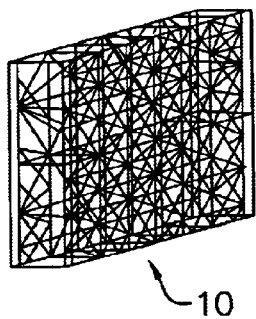 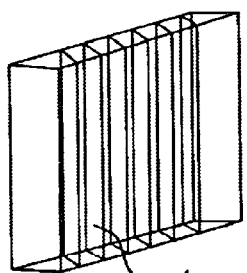 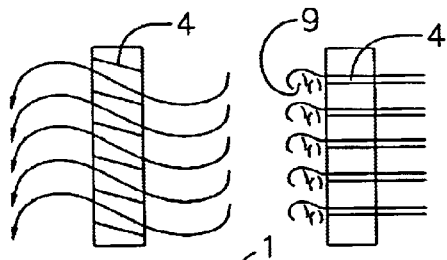
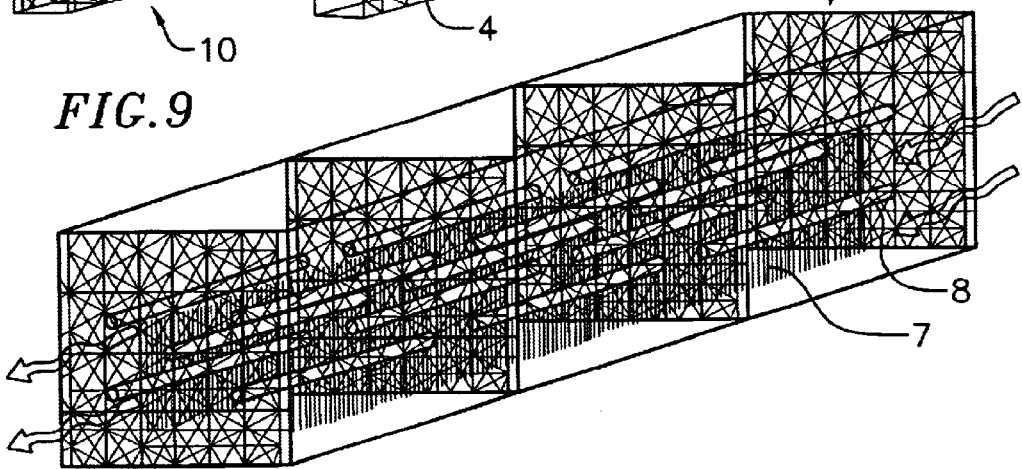
FIG. 9

MODULAR DRAINAGE CHANNELS

CROSS-REFERENCE TO RELATED APPLICATION

This application claims priority of International application number PCT/AU00/01261, filed Oct. 18, 2000, which in turn claims priority of Australian application number PQ 3490, filed Oct. 18, 1999.

The present invention relates to a modular drainage channels and in particularly to box-shaped perforated walled water storage/drainage modules, which are, wrapped either individually or as a group in geofabrics to be used as underground water storage and slow release systems.

It has been known to use drainage modules, as shown in Australian patent application no. 12688/95, to produce underground storage/slow release reservoirs to help in re-establishing the natural water cycle, which has been disrupted by urbanisation.

In one broad form the present invention comprises an underground infiltration drainage system comprising water storage and/or water piping formed by a plurality of load bearing box like modules, arranged adjacently and wrapped in water permeable geotextile, said modules having external walls with openings therethrough, such that water can flow into and out of the storage and/or piping through the perforated walls, wherein said perforated walls have peripheral edge members, with thin web members, extending between the peripheral edge members, to form support for the geotextile, and to define the openings.

Preferably the web members define a plurality of arrays, with each member in the array parallel, with the arrays meeting at common nodes.

In other embodiments the web members can be curved or sinusoidal or formed from a plurality of intermeshing concentric circles or curves.

In a further form the invention comprises an underground drainage system comprising water storage and/or water piping formed by a plurality of load bearing box like modules, arranged adjacently and wrapped, either singularly or jointly, in water permeable geotextile, said modules having external walls with perforations therethrough, such that water can flow into and out of the storage and/or piping through the perforated walls, wherein said perforated walls have peripheral edge members, with thin web members, extending between the peripheral edge members, to form support for the geotextile, and to define the perforations, and having extending within the box modules, contact surfaces to harbour bacterial and microbial organisms, which assist in purifying the water passing therethrough.

In yet a further form the invention comprises an underground drainage system comprising water storage and/or water piping formed by a plurality of load bearing box like modules, arranged adjacently and wrapped, either singularly or jointly, in water permeable geotextile, said modules having external walls with openings therethrough, such that water can flow into and out of the storage and/or piping through all the perforated walls, wherein said perforated walls have peripheral edge members, with thin web members, extending between the peripheral edge members, to form support for the geotextile, and to define the perforations, and have extending within the box modules, at least one plate having openings peripheral edge members, with thin web members, extending between the peripheral edge members to form turbulence in the water flowing therethrough.

The present invention will now be described with reference to the accompanying drawings in which:

FIG. 3 illustrate schematically angled web members of a wall of a modular unit according to another embodiment of the present invention;

FIG. 4 illustrates schematically the water flow through the angled web members of the drainage module shown in FIG. 3;

FIG. 5 illustrates schematically the water flow through nonangled web members of a drainage module 2;

FIG. 6 illustrates schematically a turbulence plate suitable for use in an embodiment of the present invention;

FIG. 7 illustrates schematically a cross sectional view through a series of modules according to another embodiment of the present invention show the use of filament material to harbour bacterial and microbial organisms, which assist in purifying the water passing therethrough, and the during low flow conditions;

FIG. 8 illustrates schematically a cross sectional view through a series of modules as shown in FIG. 7 during faster flow conditions; and FIG. 9 illustrates schematically a further embodiment of the series of modules according to another embodiment of the present invention showing a different array of the filaments.

Because of the continuing urbanisation of the environment, the natural cycle of water flow back into the soil has been altered. The water rather than being absorbed close to the area of rain runs along water impervious gutters, roads and drainage system and is transported to the sea or rivers with little absorption into the local soil.

Further because of the pollutants such as oils and greases, the runoff from the streets is usually contaminated.

Figure 1:
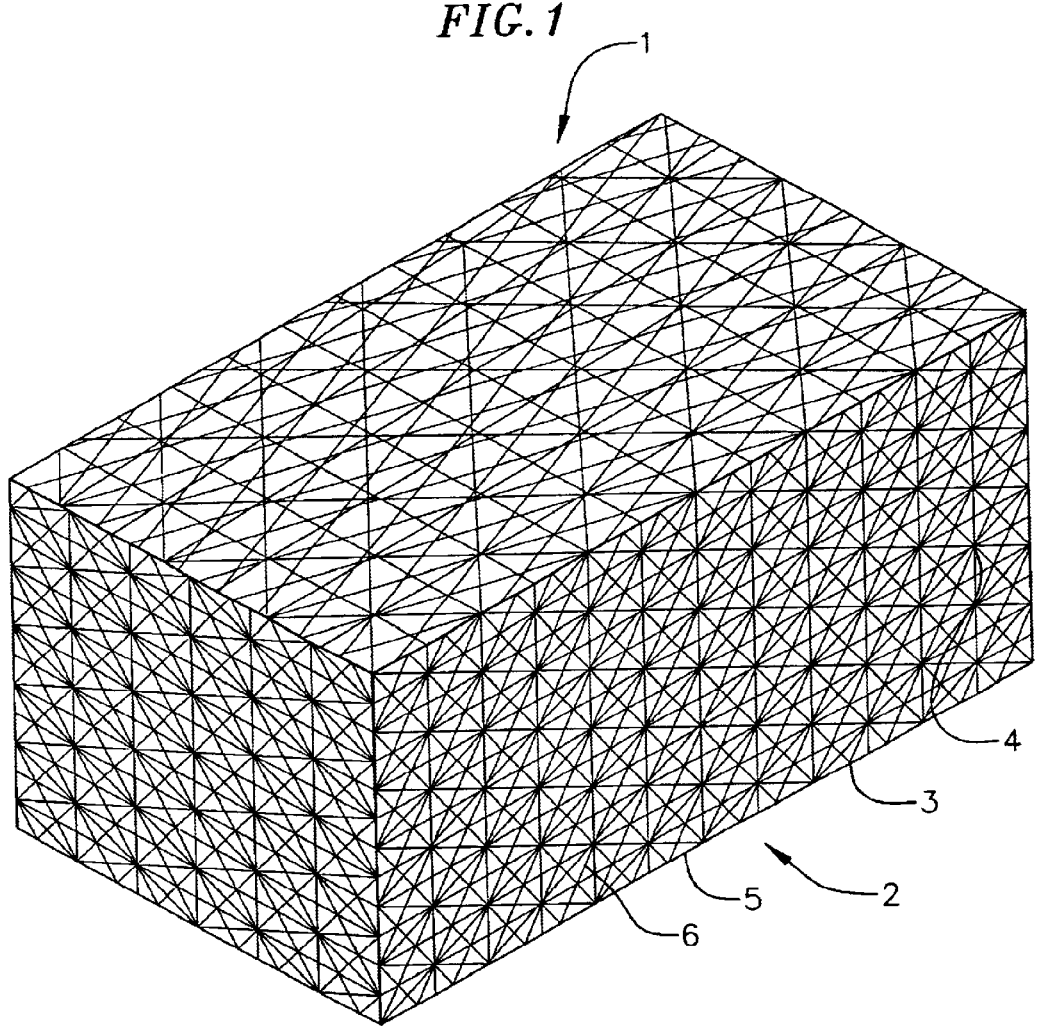
FIG. 1 illustrates schematically the pattern of the web members in the walls of a modular unit of one embodiment of the present invention.
Figure 2:
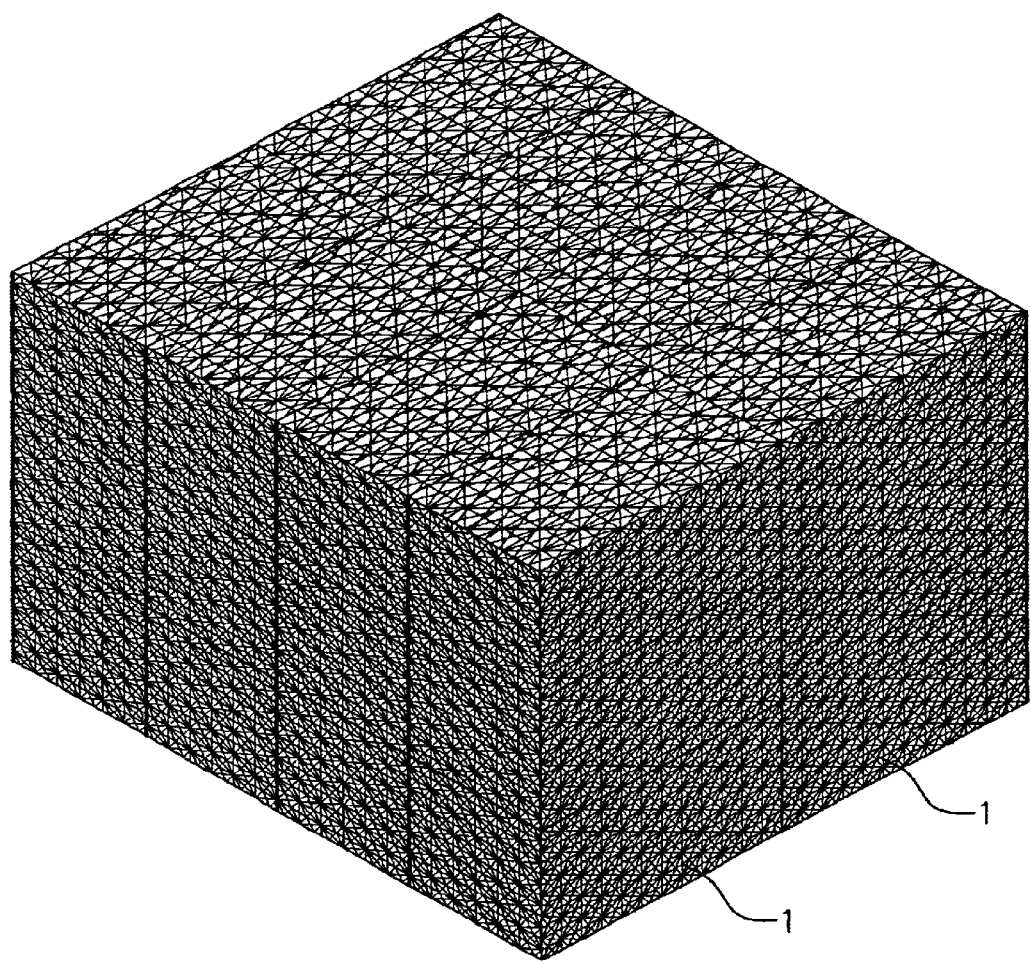
FIG. 2 illustrates schematically a large storage unit formed by joining together a plurality of drainage modular units, as shown in FIG. 1

The present invention provides a system of modular drainage units (1), which are box-shaped, as shown in FIGS. 1 & 2, and can be placed together, and wrapped in a water permeable geotextile, to form an underground channel or storage, which allows water to pass in either direction through the walls (2) of the modules (1).

Existing drainage modules are known, but these usually use a double wall system having alternate support areas and perforations in a checkerboard pattern. Such construction, while most suitable for the task of balancing the requirements of allowing maximum perforations while providing adequate support of the geofabric is expensive.

Further the perforation area is usually only around 60% maximum of the total area of the walls of the module. This creates a problem in that where the geofabric touches on the support surface water is drawn through the geofabric and from the soil above by capillary action.

As shown in FIG. 1 a wall (2) of drainage module (1) according to one embodiment of the present invention comprises edge supports (3) with a plurality of thin web members (4), linking the edge supports (3). These web members (4), can be curved, actuate, sinusoidal, circular or any other suitable shape. However preferably they are in the form of a plurality of parallel straightline arrays, which intersect at nodes (5), thereby forming a plurality of triangular openings (6), separated by the thin web members (4). The web members (4) can be of any suitable depth to provide structural support for the drainage modules (1), which have to be able to withstand the weight of soil under which it is buried as well as any live loads, such as vehicles or pedestrians. Further the web members could be of different thicknesses.

This arrangement provides excellent support for the geofabric, while providing an extremely large proportion of aperture area when compared to the prior art drainage systems. Thus as there is a reduction in the area of geofabrics touch the support surfaces, there is less capillary suction of the water in the soil above the module, and further there is an increase in the osmosis and reverse osmosis through the side and bottom walls.

To increase turbulence of water flowing into the modules (1), the web members (4) could angled, as shown in FIGS. 3 & 4, to assist in the aeration of the water.

Additionally depending upon the velocity of the water flowing through the walls, as shown in FIG. 5 turbulent flow with resulting eddies (9) will form, as the flows over horizontal web members, to assist in the treatment of the water. Additionally, as shown in FIG. 6, the wall (10) of the modular drainage unit (1) could be in the form of two spaced apart walls of shallow web members.

In FIGS. 7, 8 & 9, rows of filaments (7) are supported on support rods (8), within each module (1). These filaments (7) while having little effect on the water flow through the modules (1) provide an increased surface area for the growth of bacteria, to accelerate biological, chemical and biochemical purification of the water flowing through the modular drainage system.

Further the walls (2) could be modular to be attached together to form the required shape box module (1). The internal walls need not be of the same configuration as the outer perforated walls. The walls (2) could be clipped together, on site, to form a load bearing structure and then wrapped in geofabric and buried having an immediately surrounding layer of sand.

Figure 12:
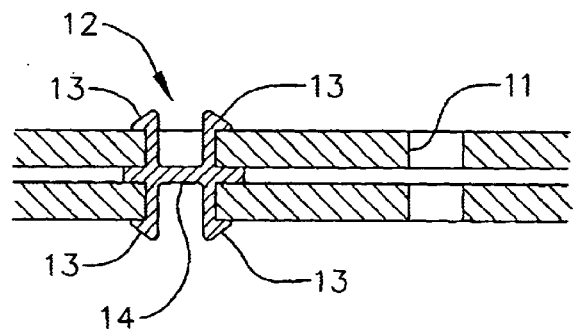
FIG. 12 illustrates a schematic cross-sectional view showing one method of joining together adjacent drainage modules.

As shown in FIG. 2, the modular drainage units (1) can be joined together to form larger storage or dispersal units. Located on the web members (4) can have open tubes (11), which can be located on the nodes (5) or any suitable position on the web members (4). As shown in FIG. 12, a simple split leg pin connector (12) can be used to secure one modular drainage unit (1) to adjacent units. One side of the connector (12) is pushed into the open tube (11) of one modular drainage unit (1) and the adjacent unit is forced over the other side of the connector (12) that extends through the open tube (11), and locks onto the tube (11) by means of projections (13). A central collar (14)keeps the two drainage units (1) apart and ensures that the connector (12) is secured tightly onto each of the drainage units (1).

Figure 10:
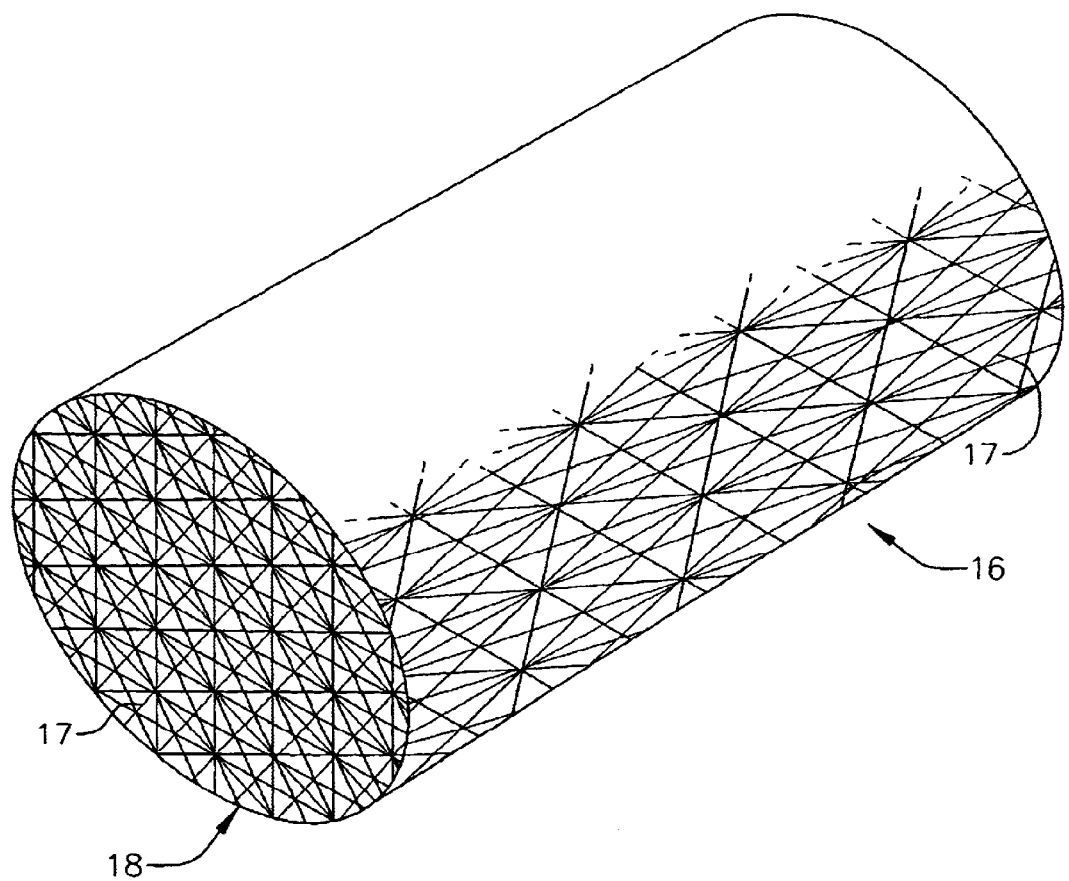
FIG. 10 illustrates schematically another embodiment of a drainage modular unit that is formed as a cylinder.

In another embodiment, the drainage unit (15) could be a cylinder as shown in FIG. 10, wherein the outer cylindrical surface (16) is formed by arrays of web members (17) that meet at various nodes, and the circular ends (18) are flat and have web members (17) similar to those of the earlier embodiments. Open tubes for connectors can be located on both the web members of the circular ends (18) and the cylindrical surface (16).

Figure 11:
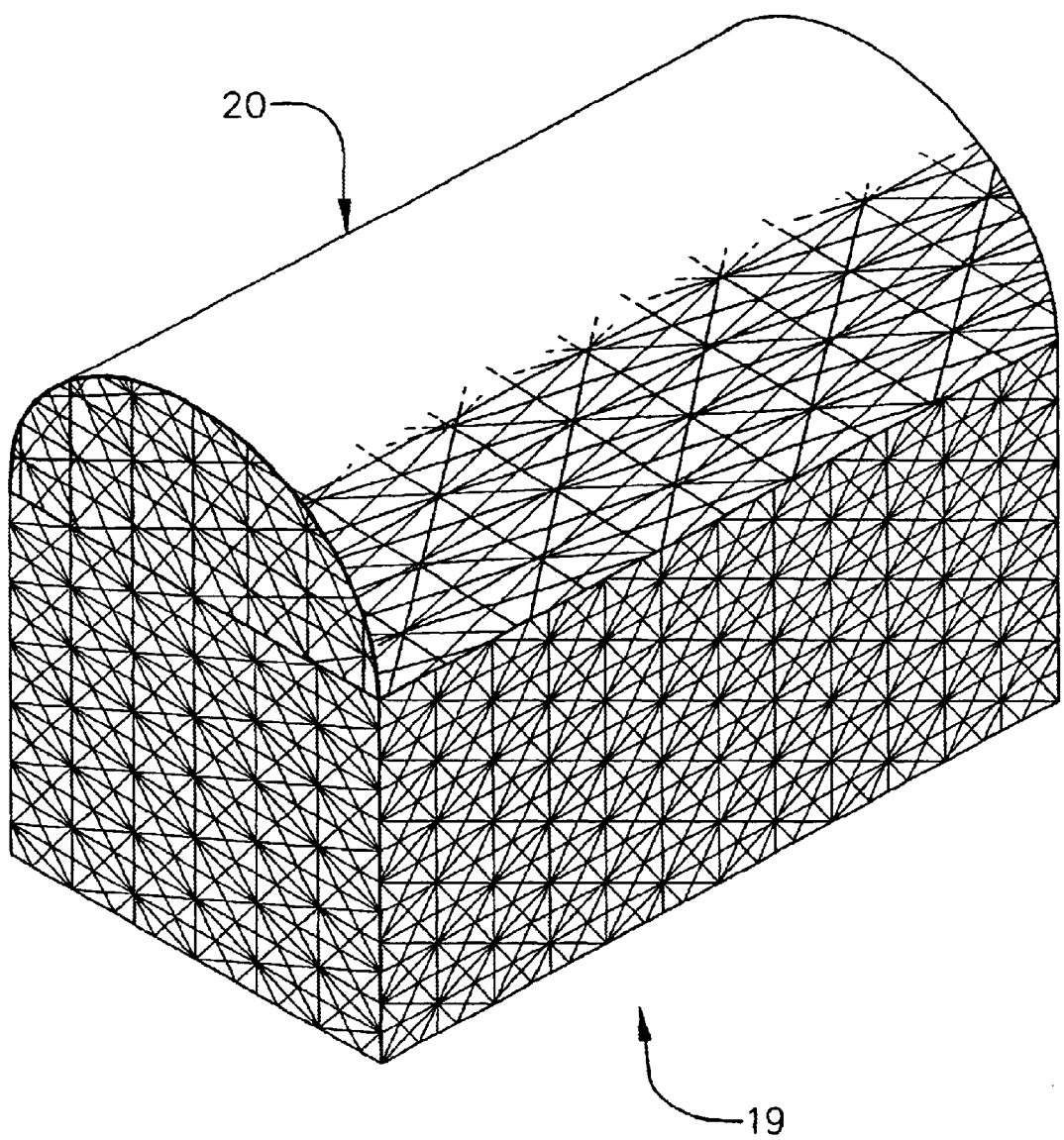
FIG. 11 illustrates schematically another embodiment of a drainage modular unit.

Another embodiment is shown in FIG. 11, wherein the drainage module (19) has a domed roof (20). All of the embodiments of the drainage units can be clipped together and wrapped in geofabric and surrounded in the excavation with permeable sand or the like and the excavation filled. The drainage units could be connected together to form any required shape such as a retention unit or piping.

Thus, because of the array of thin web members, a drainage module has been produced that while providing the load bearing properties need for underground drainage, it also provides a much larger ratio of openings to support surfaces on its walls than existing drainage units.

It should be obvious to people skilled in the art that modifications and alterations could be made to the above described embodiments without departing from the scope or spirit of the present invention.

The claims defining the invention are:

1. An underground infiltration system comprising a water storage unit formed by
   a plurality of load bearing box like modules assembled to abut against and be stacked upon adjacent said modules to form a required size storage unit and
   a water permeable geotextile wrapped around the assembled load bearing box like modules;
   said modules having external wall panels, forming a void between the external wall panels,
   said external wall panels having openings therethrough, such that water can flow into and out of the modules through the openings in said external wall panels and such that in use water can flow into and out of the storage unit through the external wall panels;
   wherein each external wall panel has
   peripheral edge members, and
   web members extending between the peripheral edge members;
   wherein the web members are thinner in their width than their depth;
   wherein the web members define a plurality of arrays extending between said peripheral edge members, with each member in a respective array being parallel, and the arrays meeting to form a plurality of nodes; and
   wherein the array of the web members define, therebetween, the openings in the wall panels, providing support for the geotextile and providing structural integrity for the load bearing box like modules.

2. An underground infiltration system comprising a water piping formed by
   a plurality of load bearing box like modules assembled to abut against adjacent said modules to form a required length of piping and
   a water permeable geotextile wrapped around the assembled load bearing box like modules;
   said modules having external wall panels, forming a void between the external wall panels,
   said external wall panels having openings therethrough, such that water can flow into and out of the modules through the openings in said external wall panels and such that in use water can flow into and out of the water piping through the external wall panels;
   wherein each external wall panel has
   peripheral edge members, and
   web members extending between the peripheral edge members;
   wherein the web members are thinner in their width than their depth;

wherein the web members define a plurality of arrays extending between said peripheral edge members, with each member in a respective array being parallel, and the arrays meeting to form a plurality of nodes; and wherein the array of the web members define, therebetween, the openings in the wall panels, providing support for the geotextile and providing structural integrity for the load bearing box like modules.

3. An underground infiltration system according to claims 1 or 2, wherein connection means are formed at the nodes to allow the load bearing box like modules to be connected to adjacent load bearing box like modules.

4. An underground infiltration system according to claim 3, wherein the connection means comprises tubular members located at the nodes, which are adapted to receive a split leg pin connector to connect the load bearing box like modules to adjacent load bearing box like modules.

5. An underground infiltration system according to claims 1 or 2, wherein the load bearing box like modules are cylindrical.

6. An underground infiltration system comprising a water storage unit formed by a plurality of load bearing box like modules, being in the shape of rectangular prisms, assembled to abut against and be stacked upon adjacent said modules to form a required size storage unit and a water permeable geotextile wrapped around the assembled load bearing box like modules;

said modules having external wall panels, forming a void between the external wall panels, said external wall panels having openings therethrough, such that water can flow into and out of the modules through the openings in said external wall panels and such that in use water can flow into and out of the storage unit through the external wall panels;

wherein each external wall panel has
peripheral edge members, and
web members extending between the peripheral edge members;

wherein the web members are thinner in their width than their depth;

wherein the web members define a plurality of arrays extending between said peripheral edge members, with each member in a respective array being parallel, and the arrays meeting to form a plurality of nodes;

wherein the array of the web members define, therebetween, the openings in the wall panels, providing support for the geotextile and providing structural integrity for the load bearing box like modules; and connection means formed at the nodes to allow the load bearing box like modules to be connected to adjacent load bearing box like modules.

7. An underground infiltration system comprising a water piping formed by a plurality of load bearing box like modules, being in the shape of a rectangular prism, assembled to abut against adjacent said modules to form a required length of piping and a water permeable geotextile wrapped around the assembled load bearing box like modules;

said modules having external wall panels, forming a void between the external wall panels, said external wall panels having openings therethrough, such that water can flow into and out of the modules through the openings in said external wall panels and such that in use water can flow into and out of the water piping through the external wall panels;

wherein each external wall panel has
peripheral edge members, and
web members extending between the peripheral edge members;

wherein the web members are thinner in their width than their depth;

wherein the web members define a plurality of arrays extending between said peripheral edge members, with each member in a respective array being parallel, and the arrays meeting to form a plurality of nodes;

wherein the array of the web members define, therebetween, the openings in the wall panels, providing support for the geotextile and providing structural integrity for the load bearing box like modules; and connection means formed at the nodes to allow the load bearing box like modules to be connected to adjacent load bearing box like modules.

8. An underground infiltration system according to claims 6 or 7, wherein the connection means comprises tubular members located at the nodes, which are adapted to receive a split leg pin connector to connect the load bearing box like modules to adjacent load bearing box like modules.

9. An underground infiltration system comprising a water storage unit formed by a plurality of load bearing box like modules assembled to abut against and be stacked upon adjacent said modules to form a required size storage unit and a water permeable geotextile wrapped around the assembled load bearing box like modules;

said modules having external wall panels, forming a void between the external wall panels, said external wall panels having openings therethrough, such that water can flow into and out of the modules through the openings in said external wall panels and such that in use water can flow into and out of the storage unit through the external wall panels;

wherein each external wall panel has
peripheral edge members, and
web members extending between the peripheral edge members;

wherein the web members are thinner in their width than their depth;

wherein the web members define a plurality of arrays extending between said peripheral edge members, with each member in a respective array being parallel, and the arrays meeting to form a plurality of nodes;

wherein the array of the web members define, therebetween, the openings in the wall panels, providing support for the geotextile and providing structural integrity for the load bearing box like modules; and contact surfaces extending within the box modules to harbor bacterial and microbial organisms, which assist in purifying the water passing therethrough.

10. An underground infiltration system according to claim 9, wherein connection means are formed at the nodes to allow the load bearing box like modules to be connected to adjacent load bearing box like modules.

11. An underground infiltration system according to claim 10, wherein the connection means comprises tubular members located at the nodes, which are adapted to receive a split leg pin connector to connect the load bearing box like modules to adjacent load bearing box like modules.

12. An underground infiltration system comprising a water storage unit formed by a plurality of load bearing box like modules assembled to abut against and be stacked upon adjacent said modules to form a required size storage unit and a water permeable geotextile wrapped around the assembled load bearing box like modules;

said modules having external wall panels, forming a void between the external wall panels, said external wall panels having openings therethrough, such that water can flow into and out of the modules through the openings in said external wall panels and such that in use water can flow into and out of the storage unit through the external wall panels;

wherein each external wall panel has
  peripheral edge members, and
  web members extending between the peripheral edge members;

wherein the web members are thinner in their width than their depth;

wherein the web members define a plurality of arrays extending between said peripheral edge members, with each member in a respective array being parallel, and the arrays meeting to form a plurality of nodes;

wherein the array of the web members define, therebetween, the openings in the wall panels, providing support for the geotextile and providing structural integrity for the load bearing box like modules; and at least one plate extending within the load bearing box like modules, and having peripheral edge members with thin web members extending between the peripheral edge members forming openings and to form turbulence in the water flowing through said openings.

13. An underground infiltration system according to claim 12, wherein connection means are formed at the nodes to allow the load bearing box like modules to be connected to adjacent load bearing box like modules.

14. An underground infiltration system according to claim 13, wherein the connection means comprises tubular members located at the nodes, which are adapted to receive a split leg pin connector to connect the load bearing box like modules to adjacent load bearing box like modules.

* * * * *